(12) United States Patent
Brodsky (10) Patent No.: US 8,688,615 B2
(45) Date of Patent: Apr. 1, 2014

(54) CONTENT SELECTION BASED ON CONSUMER INTERACTIONS

(71) Applicant: SoundCloud Limited, London (GB)

(72) Inventor: Peter Brodsky, Ithaca, NY (US)

(73) Assignee: Soundcloud Limited, London (GB)

( * ) Notice: Subject to any disclaimer, the term of this patent is extended or adjusted under 35 U.S.C. 154(b) by 0 days.

(21) Appl. No.: 13/974,239

(22) Filed: Aug. 23, 2013

(65) Prior Publication Data

US 2013/0346187 A1 Dec. 26, 2013

Related U.S. Application Data

(63) Continuation of application No. 12/819,529, filed on Jun. 21, 2010, now Pat. No. 8,543,529.

(60) Provisional application No. 61/220,914, filed on Jun. 26, 2009.

(51) Int. Cl.
G06F 17/00 (2006.01)
G06N 5/02 (2006.01)

(52) U.S. Cl.
USPC .......................................................... 706/50

(58) Field of Classification Search
USPC .......................................... 706/14, 46, 48, 50
See application file for complete search history.

(56) References Cited

U.S. PATENT DOCUMENTS 8,457,469 B2 * 6/2013 Suzuki ........................ 386/239
2006/0288845 A1 * 12/2006 Gale .............................. 84/609
2007/0088727 A1 4/2007 Kindig
2008/0133417 A1 * 6/2008 Robinson ...................... 705/52
2009/0177967 A1 * 7/2009 Moore et al. .................. 715/716
2009/0300008 A1 12/2009 Hangartner et al.

OTHER PUBLICATIONS

Andric, A. et al. "Automatic playlist generation based on tracking user's listening habits", Multimedia Tools and Applications, vol. 29, No. 2, Springer, 2006, pp. 127-151. DOI: 10.1007/s11042-006-0003-9.*
Cai, R. et al. "Scalable music recommendation by search." In Proceedings of the 15th international conference on Multimedia, pp. 1065-1074. ACM, 2007. DOI: 10.1145/1291233.1291466.*
Pampalk, E. et al. "Dynamic playlist generation based on skipping behavior". In Proceedings of the 6th International Conference on Music Information Retrieval (ISMIR 2005), Sep. 2005, 4 pages.
Ahmad, Wasfi, A.M. "Collecting User Access Patterns for Building User Profiles and Collaborative Filtering". IUI 99 Redondo Beach, CA, USA. ACM. 1999. pp. 57-64.

* cited by examiner

*Primary Examiner* — Jeffrey A Gaffin
*Assistant Examiner* — Benjamin Buss
(74) *Attorney, Agent, or Firm* — Brown Rudnick LLP (57) ABSTRACT

In some embodiments, there is provided a technique for detecting a consumer's skipping habits at a given time and determining the consumer's current preferences based at least in part on those skipping habits. Skipping habits are determined by detecting which content is skipped (or not skipped) during presentation of content. Skipping habits, indicating trends in the consumer's consuming or skipping of content, that are detected during presentation of content may be used to determine a consumer's current preferences. Selection of content for presentation may be based on current preferences of the consumer. In this way, a consumer's interactions with the content, including the consumer's skipping habits, can be used to alter a selection of content to be presented to the consumer.

5 Claims, 4 Drawing Sheets

CONTENT SELECTION BASED ON CONSUMER INTERACTIONS

RELATED APPLICATIONS

This application is a continuation of U.S. patent application Ser. No. 12/819,529 filed Jun. 21, 2010, which claims priority under 35 U.S.C. 119(e) to U.S. Provisional Application No. 61/220, 914, entitled "Content selection based on consumer interactions," filed Jun. 26, 2009, and the entirety of each is herein incorporated by reference.

BACKGROUND

People today are often overwhelmed by choice when deciding what music to which to listen. As a person is presented with more and more options, a person may find selecting appropriate music to listen to, etc. at a given time increasingly difficult. Accordingly, many people seek out tools that help them select music to which to listen.

Several methods for automation of music selection exist that people may use. Random selection (i.e., "shuffle") is one technique, in which a random song from the person's library is selected and played. Other techniques exist that select music based on a desired attribute of a song. Many such techniques involve selecting a next piece of music based on attributes of a current-playing piece of music. When a person is listening to music, if the music has a particular attribute (e.g., is music from a particular genre), then another piece of music having that same particular attribute may be selected as the next piece of music to play. Using these attribute-identification techniques, once an attribute is identified, music having that same attribute is selected each time music is to be played.

To select a next piece of music using attribute-identification techniques, the attributes of pieces of music available for selection are analyzed to identify attributes of the pieces of music. For example, a genre (e.g., country music, music from romantic comedy movies, etc.) may be identified for the music. These attributes may be identified in various ways, including through analysis of metadata associated with the music (e.g., a data field associated with the music that lists a genre for the media) and performing data processing on the content to identify properties of content (e.g., performing an acoustical waveform analysis to identify attributes like tempo). When a piece of music available for selection is identified as having the attribute on which the selection is being conducted, the piece of music may be selected and played back.

SUMMARY

In one embodiment, there is provided a machine adapted to select content to be presented to a consumer. The machine comprises at least one storage medium comprising processor-executable instructions and storing a content library. The content library is stored as a collection of sets of content, where each first stored set of content comprises one or more pieces of content and is related to at least one second stored set with an indication of a likelihood that the consumer will want to consume content of the first stored set close in time to content of the second stored set. The machine further comprises at least one processor that, upon executing the processor-executable instructions stored in the at least one storage medium, selects content to be presented to the consumer from the content library stored on the at least one storage medium. The at least one processor selects the content to be presented by performing acts of presenting a first content from a first set to the consumer and, if the consumer consumes the first content in entirety, selecting a second content from the first set to present to the consumer next. If, however, the consumer skips the first content, the at least one processor selects a second set from which to select content, wherein the second set is related to the first set by the likelihood. The second set is selected to have a likelihood inversely proportional to a number of recent skips of the consumer.

In another embodiment, there is provided a computer-implemented method for selecting content to be presented to a consumer. Content is selected from a content library stored on at least one storage medium that is stored as a collection of sets of content. Each first stored set of content comprises one or more pieces of content and is related to at least one second stored set with an indication of a likelihood that the consumer will want to consume content of the first stored set close in time to content of the second stored set. The method comprises acts of presenting a first content from a first set to the consumer and, if the consumer consumes the first content in entirety, selecting a second content from the first set to present to the consumer next. The method further comprises, if the consumer skips the first content, selecting a second set from which to select content, wherein the second set is related to the first set by a likelihood. The second set is selected to have a likelihood inversely proportional to a number of recent skips of the consumer.

In a further embodiment, there is provided at least one computer-readable storage medium having stored thereon a data structure. The data structure stores a content library as a collection of records. The data structure comprises at least one record defining a set of content. Each record comprises at least one subrecord identifying a piece of content that is in the set, and an identification of at least one other set stored in another record and an indication of a likelihood that a consumer will want to consume content of the set close in time to content of the other set. The data structure enables performance of a method of selecting content for presentation to the consumer from one or more sets defined by the at least one record in such a manner that, if it is determined that the consumer is not enjoying a first set, a second set having a low likelihood that the consumer will want to consume the first set close in time to the second set can be selected.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Conventional techniques for automating selection of music for a person rely on either a random selection or identifying a particular attribute and selecting similar music (i.e., music having that attribute) each time. In other words, when a person is listening to a song using these conventional techniques, either a random song or a song having a particular attribute is always selected next.

Applicant has appreciated, however, that these conventional techniques are typically not useful in aiding a consumer in identifying pieces of content to consume. A random selection, for example, merely assists a user in blindly selecting content to consume, but would not lead to identifying multiple pieces of content or a type of content that a consumer desires to consume. An attribute-based selection, on the other hand, leads to a similar type of content (i.e., content having the identified attributed) being presented repeatedly. This type of selection may be useful when a consumer is able to select a particular attribute of content to be presented, but a consumer may be as unable to select a particular attribute as they are able to select particular content. Selecting an attribute on which to base the attribute-selection technique may therefore place the consumer in the same problem of choice that prompted the consumer to originally rely on the automation techniques. Additionally, Applicant has appreciated that a consumer may not always want similar types of content to be presented and may at times want different types of content to be presented. For example, a consumer may have a hard time selecting an attribute upon which the attribute-based selection may be carried out and would like different pieces of content presented to aid the consumer or, after several similar pieces of content have been presented to a consumer, the consumer may start to desire something different. The attribute-identification techniques, however, require the consumer to make a positive decision about an attribute or a type of content the consumer desires to change the selection, and the consumer is again faced with the same problem of choice. Thus, using these conventional techniques, consumers may fall into always consuming only one type of content or may be deterred from consuming content.

Further, Applicant has recognized and appreciated that conventional techniques do not allow for a consumers' likes and dislikes to be incorporated into a selection process. Rather, only objective similarities (like common attributes) are used to select content for presentation to a consumer. Applicant has appreciated that consumers may be more likely to consume content when selections are personalized, rather than relying on some objective factors that have no relation to the consumer.

Applicant has appreciated that personalizing presentation of content to a consumer is possible through observing the consumer's interactions with presented content. Specifically, if a consumer consumes an entire piece of content (e.g., listens to an entire song or reads an entire document), then the consumer may have enjoyed the piece of content. When a consumer enjoys a piece of content, the consumer is likely to want to consume a similar piece of content. A similar piece should therefore be selected and presented. If, however, the consumer cuts short presentation of the content and asks for another piece of content (which is referred to herein as a "skip"), then the consumer likely did not enjoy the content or did not find the content suitable in that specific moment. When a consumer does not enjoy a piece of content, the consumer is likely to want a different type of content. A dissimilar piece should therefore be selected and presented.

Described herein are techniques for personalizing presentation of content to a consumer and selecting content for presentation based on the consumer's interactions with the content. This can be done in any suitable way.

In accordance with some of these techniques, selection of content to be presented to a consumer is automated in a way that personalizes each consumer's content presentation experience. Personalization, using techniques described here, may include selecting content for a consumer based on a determination of what the consumer will likely enjoy and that the consumer will consume (e.g., listen to or watch). Personalization in this way provides content that consumers are likely to enjoy and enables consumers to skip fewer pieces of content when consuming content, thereby allowing the consumers to consume more content and consume for longer periods of time without interrupting the presentation of content.

In some embodiments, there is provided a technique for detecting a consumer's skipping habits at a given time and determining the consumer's current preferences based at least in part on those skipping habits. Skipping habits are determined by detecting which content is skipped (or not skipped) during presentation of content. A piece of content may be detected as skipped if the consumer did not consume an entirety of the content or did not consume a certain amount of the content. In some embodiments, if a consumer stops consuming the content within some threshold, such as a length of time (e.g., five seconds) or a portion of a content (e.g., five percent of the content), the consumer may be detected to have skipped the content. Any suitable threshold may be used to detect a skip. Skipping habits, indicating trends in the consumer's consuming or skipping of content, that are detected during presentation of content may be used to determine a consumer's current preferences. Selection of content for presentation may be based on current preferences of the consumer. In this way, a consumer's interactions with the content, including the consumer's skipping habits, can be used to alter a selection of content.

Described further below are exemplary techniques and exemplary implementations of personalization that may be used in some embodiments. First, however, general principles that may be implemented in some (but not all) embodiments are described.

Content, as used herein, may be any suitable form(s) of information a consumer may experience. One example of content is media content (also referred to herein as "media"), which may include video (e.g., TV, movies, video clips), audio (e.g., music), still images (e.g., photographs), and other types of media. Another example of content is written content, such as Web pages, word processing documents, slideshows and other presentations, and other types of written content. Content may include any information in one or more forms. Embodiments may be used to automate and personalize selection and presentation of any suitable type of content. Accordingly, while examples are given herein of embodiments of the invention that operate with one particular type of content (e.g., music), it should be appreciated that those and other embodiments may also operate with other types of content.

A consumer of content is one able to experience the content. When a consumer is presented with content, the consumer may experience the content in any way, which may vary based on the content and on the consumer. For some types of content and consumers, experiencing content may include listening to or viewing content, while for other types of content and consumers, experiencing may include performing some analysis process on the content, such as by associating a piece of content with other content. A consumer may be a person, but may also be any other suitable consumer, including software applications or automated processes. Accordingly, while embodiments are described below as being operated by a person, embodiments are not so limited. Any suitable user may be a consumer in other embodiments.

Several examples of how embodiments may be implemented to personalize selection of content to be presented to a consumer are provided below. It should be appreciated, however, that these examples are each merely illustrative of how the techniques described herein may be implemented and may operate. Other techniques and other embodiments are possible.

In some embodiments, pieces of content may be organized into sets of content, and each set may be related to other sets by a definition of how likely the consumer is to want to consume those two sets close together in time. In this embodiment of the invention, at a particular time, content is selected from one set of content for presentation to the consumer. A consumer's skipping habits are used to determine when to move to a different set and to choose a set to which to move. If, according to the detected skipping habits, a consumer is not skipping or is skipping very little, the same set may be maintained and used to select content, or a second set may be selected which is very similar and has a high likelihood that the consumer will want to consume the second set with the original set. If, however, according to the detected skipping habits a consumer is skipping many times, then a third, dissimilar set may be selected and one with a low likelihood that the consumer will want to listen to third set together with the original set (because, based on the skipping, the consumer is detecting not to be enjoying the original set). As a consumer's skips increase in number and/or frequency, then sets that are more dissimilar and have a lower likelihood that the consumer will want to consume the sets together with the original set are selected.

In one particular example of how this embodiment may be implemented, a consumer's content library (i.e., an assortment of content that is available to a consumer) is stored as a collection of sets of content. Each set of content may include one or more pieces of content that are associated in some way. For example, pieces of content in a set may share a common attribute (e.g., musical genre) or may be grouped by an arbitrary selection by a consumer (e.g., web sites that a person likes to read, which may include both news web sites and joke web sites).

In this embodiment, each set of content is related to other sets by a distance. The distance between a first set and a second set is an indication of how likely a consumer will want to consume content from the first and second sets together or close in time. For example, one person may be very likely to want to consume content from a first set of country music and a second set of country music (e.g., from two different artists), but may be less likely to want to consume content from a first set of a country music and a second set of hip hop music. Instead, the person would be likely to consume country music and hip hop music at different times, so those two sets would have a high distance between them.

In some implementations, distance may be considered as a measure of how similar two sets of content are, and similarity may be used as a factor in determining distance in some such implementations. However, in other implementations of the invention, similarity is not a factor in considering distance, but rather the distance may only be indicative of consumer preferences. In such implementations, for a given consumer, two sets of content that may be objectively or subjectively similar may have a high distance, because that consumer may not want to listen to those sets of content at a similar time.

In this embodiment, at a particular time, content is selected from one set of content for presentation to the consumer. A consumer's skipping habits are used to determine when to move to a different set and to choose a set to which to move. If, according to the detected skipping habits, a consumer is not skipping or is skipping very little, the same set may be maintained and used to select content, or another set may be selected which has a low distance to the original set (i.e., is very similar and/or has a high likelihood that the consumer will want to consume the second set with the original set). If, however, according to the detected skipping habits, a consumer is skipping many times, then a set with a high distance to the original set (i.e., a low likelihood that the consumer will want to consume the set with the original set). As a consumer's skips increase in number and/or frequency, then sets with higher and higher distances are selected.

Sets of content may be useful in some embodiments, as sets can be used to limit potential choices for next content to only content within a particular set (unless skipping behavior leads to another set being selected). Limiting potential choices for next content may mean that selecting content can be done more quickly and efficiently, and that a next content may be selected prior to an end of presentation of a current content. Selecting content more efficiently and early may have advantages in some platforms. For example, in some cases where retrieving content for presentation may be slow (e.g., retrieving the content over a network such as the Internet or from a relatively slow storage, such as a magnetic disk), selecting next content early, prior to the end of presentation of current content, may lead to the next content being retrieved and available when presentation of the current content ends, without the consumer experiencing any delay. Additionally, in environments with limited processing or power resources, limiting the complexity of selecting a next content may be advantageous at least for using less resources. Accordingly, some embodiments may benefit from the use of the sets described above.

Embodiments are not limited to operating with sets, however. In some embodiments, rather than organizing content into sets and then relating sets to one another, each piece of content may be related to each other piece of content. For example, each piece of content may have a distance to each other piece of content. An individual piece of content may be selected and presented, and a next piece of content may be selected and presented based on the distance between the pieces of content. Techniques described herein for selecting sets of content based on skipping behavior may be used in embodiments that operate without sets by using the skipping behavior to select between pieces of content rather than sets.

One illustrative embodiment that operates with sets of content is discussed in greater detail below. Other embodiments are possible, however, that do not operate according to these exemplary techniques.

In this illustrative embodiment, techniques are provided for navigating between sets of songs, also known as "lists" or "moods." These sets may or may not be mutually exclusive, such that a song may be in one or multiple sets. As will be appreciated from the description below, the techniques described in this example may be particularly advantageous with many different sets of songs (or other content), but embodiments of the invention may operate with any suitable number of sets, including one or two.

Sets are related to other sets by distance. As discussed above, the distance between a first set and a second set is an indication of how likely a consumer will want to consume content from the first and second sets together or close in time. The distance may be represented numerically or in any other way, as sets and information about sets may be stored in any suitable manner.

These sets may be created in any suitable manner, and the distances between them may be established in any way. For example, the sets and distances may be set by a human. For example, a user may manually create a list of songs and provide additional input describing how similar those sets are to one another and how likely it is that he or she will want to listen to them close together in time. Additionally or alternatively, sets may be created by machine, such as by using artificial intelligence methodologies or collaborative filtering that defines sets of content and identifies, based on past actions of a consumer or information about the content, how likely a consumer is to want to listen to the songs close together in time.

In some cases, sets may be created by a machine through identifying which songs a user enjoys together in time. This may be done through analyzing a user's skipping habits while listening to songs and establishing distances between songs similar to the distance between sets. When two songs are presented close together in time and the user is detected as having enjoyed listening to the two songs, then a distance between the songs is set to be small. When two songs are presented close together in time and the user is detected as not having enjoying listening to the two songs together (because, for example, the user skipped the second song), then a distance between the songs is set to be large.

In one exemplary technique for establishing sets, all songs are initially given equal distances to all other songs by creating a square, symmetric matrix of song-to-song distances. The diagonal of this matrix (the cells where the row and the column relates to the same song) is undefined. Any given row and any given column is made to sum to one, as each cell indicates a probability that a user will want to consume the songs close together in time. When a consumer consumes two songs, one after the next, in their entirety, the consumer may be detected to enjoy listening to the songs together and the distance between them is shortened by editing a value in the matrix. Similarly, when a user consumes one song in the entirety and then skips a next song, the consumer may be detected not to enjoy listening to the songs together and the distance between them may be lengthened by editing a value in the matrix. Any suitable technique may be used for editing distances contained in cells of the matrix, including an error-weighted function or any other suitable weighting function. The amounts that the values are increased and decreased may vary between embodiments. In some cases, the value in a cell may be a number between 0.0 and 1.0, and the value may vary in that range. In some cases, a range of potential values may be fragmented into specific units and the value in a cell may be one of those units (e.g., 0.0, 0.1, 0.2, 0.3, . . . ). To adjust the value in these cases, the value may be increased one unit or decreased one unit.

In some embodiments, editing a value in a cell of a matrix may comprise making both major and minor adjustments (i.e., rough and fine adjustments) to the value of the cell. For example, when a matrix is first assembled for songs and values are edited, a training process may be carried out based on consumer skipping habits in which the values are edited by a first amount that is relatively large (e.g., 0.10). The training process makes major adjustments to the values to adjust the matrix to the consumer's preferences relatively quickly. Following some threshold period of time or threshold number of adjustments (e.g., number of adjustments to all cells or number of adjustments to individual cells), the training process ends, after which values of the cells may be edited by a second amount that is relatively small (e.g., 0.2). Making the small adjustments in this way ensures that temporary consumer preferences or temporary variations do not result in major changes to the matrix.

Figure 1:
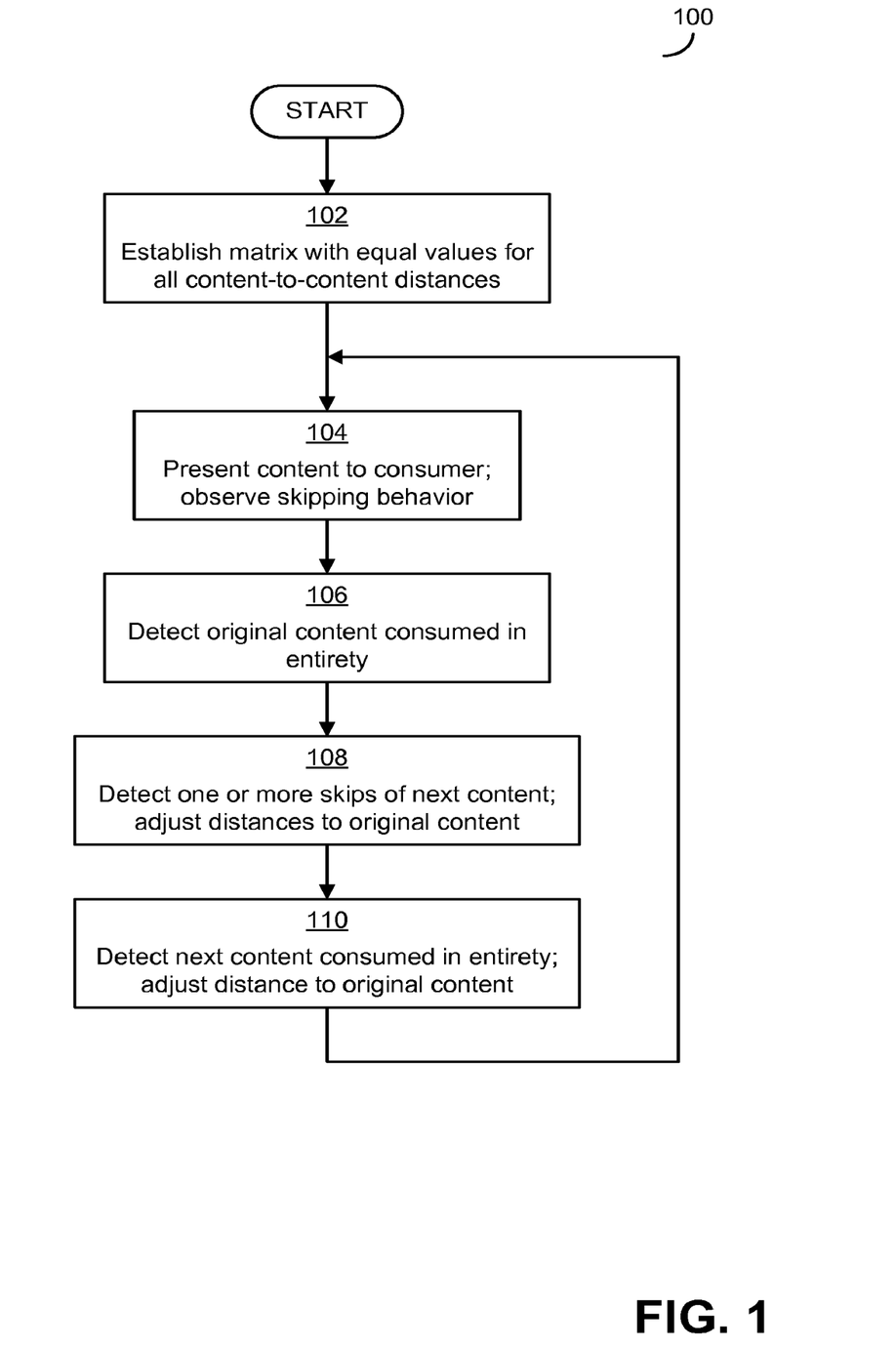
FIG. 1 is a flowchart of one exemplary process for generating a matrix identifying a likelihood that a consumer will want to consume pairs of content close together in time.

FIG. 1 shows one exemplary process 100 that may be carried out in some implementations for adjusting song-to-song distances of a matrix based on skipping behavior. Embodiments are not limited to carrying out the exemplary process 100, as other processes are possible.

Process 100 begins in block 102, in which a matrix is established that includes song-to-song distances for all songs in a consumer's collection of songs. When the matrix is established in block 102, default values are assigned to each of the distances. In some cases, each of the default values may be identical, such as when default values for all song-to-song distances are a value like 0.5. Such is the case where the initial matrix identifies that the consumer is as likely to enjoy any two songs together as any other two songs, because no information about consumer preferences has been entered into the matrix. In other cases, however, the default values may not be identical and may be based on an analysis of the content or of any suitable metadata regarding the content. For example, songs in the same genre may be assigned a default distance smaller than that of two songs in different genres. Any suitable default values and any suitable technique for assigning default values may be used, as embodiments are not limited in this respect.

In block 104, content is selected and presented to a consumer, and skipping behavior of the consumer is observed. In block 106, a piece of content (labeled here as "original" content) is detected as being entirely consumed by the consumer, indicating that the consumer enjoyed the song. In block 108, however, a plurality of next pieces of content are presented to the consumer, each of which the consumer skips. As discussed above, the skipping indicates that the consumer did not want to consume those pieces of content and, thus, is likely not to want to consume these next pieces of content together with the original content. Accordingly, a value in the matrix indicating the distance between the original content and each of the pieces of next content presented and skipped in block 108 is increased.

In block 110, following the skipping of block 108, a next piece of content is presented to the consumer and is entirely consumed by the consumer. Because the next content of block 110 is entirely consumed, the consumer is detected to enjoy the next content. Because the consumer enjoyed both the original content of block 106 and the next content of block 110 at a similar time, a value in the matrix indicating a distance between the original content and the next content is decreased.

After the next content is consumed in its entirety in block 110, the process 100 continues by presenting next content and adjusting distances according to skipping behavior. FIG. 1 illustrates this continuity by showing the process 100 returning to block 104 to present content and observe skipping behavior.

When a distance between songs is below a threshold, the songs are entered into a set (or "mood") together. The distance between songs may change over time, in either direction, based on the consumer's listening and skipping habits. Two songs that are initially not placed in a same set may be placed in a same set at some later time if a consumer is detected as enjoying the songs together. Similarly, should the distance increase between two songs (once in a set) beyond another threshold, the songs may be removed from the set.

Once the sets and distances are established, a set is selected randomly and songs from the set are selected and played for the user. A next set could be chosen when a current set has ended (i.e. all songs in the current set have been played). Additionally, a next set could be chosen based on a user's recent skipping habits.

As described below, when songs are being played, the user's skipping habits are used to determine whether to stay in the current set, proceed to a slightly dissimilar set, or proceed to a more dissimilar set. (In this example, for ease of description, "similarity" is defined, with respect to sets, as the distance between the sets, though it should be appreciated that distance may or may not be based on any objective or subjective similarity of sets, as discussed above).

In this exemplary technique, a next set will be selected when a number of recent skips exceeds a certain threshold. Any suitable threshold may be used here. For example, the threshold may be a constant that is set by a vendor/developer of the automation techniques, or may be customized by the user. Alternatively, a threshold may vary based on a current set or on recent user skipping habits, such that if the user has not been skipping recently, the threshold may be higher (because the user apparently has been enjoying the music) than if the user has been skipping more frequently recently.

In this technique, the greater a number of recent skips, the more dissimilar a next set will be. Using a music example, after four skips, the set could change from Jazz to classic rock or from "driving to work" music to "working out at the gym" music. This is done because when a user is skipping more frequently, it may be determined that a user is not enjoying the selections and more dissimilar music should be selected. Any suitable correlation (e.g., thresholds) may be used for increasing a distance between sets based on an increasing number of skips.

"Recent," in terms of recent skips, can be defined in any suitable manner. For example, any suitable time threshold may be used to define recent, such as five minutes. As another example, skips may accumulate until it is determined that a user has enjoyed a song. If a most recent user action has been to listen to a song from a set through to completion, then a number of recent skips will be disregarded and reset to zero, such that songs are selected from that same set or from a similar set.

Figure 2:
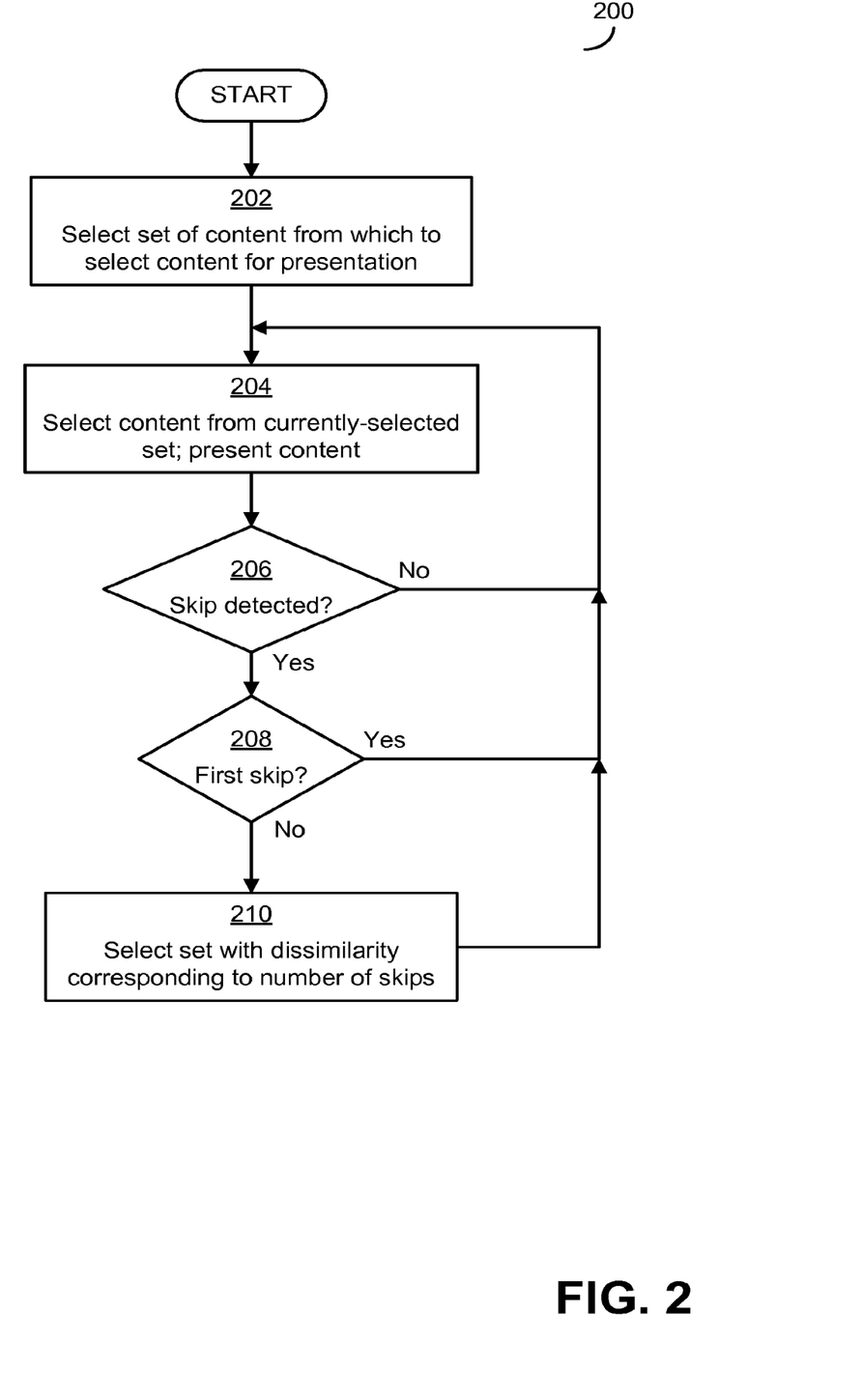
FIG. 2 is a flowchart of one exemplary process for selecting content to be presented to a consumer based on consumer interactions with content.

One exemplary process for selecting content for presentation to a consumer is illustrated in FIG. 2. Embodiments are not limited to implementing the exemplary process 200 of FIG. 2, as others are possible.

Process 200 begins when a consumer requests that content be presented (e.g., a user hits play on his/her media device to start a song playing). In block 202, a set of content from which to select content for presentation is selected. The selection of block 202 may be carried out in any suitable manner. For example, the user may have selected a song or set or may request that an automated selection of a first song or first set be made. An automated selection may be performed through a random selection, a selection of a popular set or song, or a selection of the last active set. Regardless of how the selection is carried out in block 202, a set is selected.

In block 204, content is selected from the currently-selected set and the content is presented. The selection of content in block 204 may be random, such that a piece of content in the currently-selected set is randomly selected for presentation in block 204. In block 206, a determination is made regarding whether the content was entirely consumed or a skip was detected. If no skip was detected (i.e., the content was consumed in entirety), then the process 200 continues to block 204 and a next piece of content is selected from the currently-selected set.

If, however, a skip is detected in block 206, then in block 208 a determination is made regarding whether the skip detected in block 206 is a first skip since a piece of content was entirely consumed. If the skip is the first skip, then process 200 continues to block 204 and a next piece of content is selected from the currently-selected set.

On the other hand, if it is determined in block 208 that the skip detected in block 206 is not the first skip since a piece of content was entirely consumed, a determination may be made that the consumer is not enjoying this type of content, so a dissimilar set of content (i.e., dissimilar from the currently-selected set) should be selected to provide a different type of content to the consumer. The dissimilarity of the set that is selected in block 210 corresponds to the current number of skips made by the user, such that when a consumer is skipping many pieces of content, indicating that the consumer is not enjoying any of these types of similar content, a very different type of content that the consumer may enjoy is selected. Once a new set is selected as the currently-selected set in block 210, process 200 continues to block 204, in which content is selected from the (new) currently-selected set. The selection of sets in block 210 may be a random process, influenced by the distances. Accordingly, rather than merely selecting sets according to distance, the distance may impact a random selection such that the selection is random in some ways but weighted toward sets having a desired degree of distance based on the desired degree of dissimilarity.

Distances between songs that are used in some set-creation techniques that may be used in embodiments were described above as being changed over time to reflect a user's interest or disinterest in hearing two songs together. Similarly, in some embodiments of the invention a distance between sets may change over time if a user is detected as enjoying two sets together. For example, if a user listens to a substantial portion or all of a first set, then the user may be detected as enjoying the first set. When a second set is selected for the user next or close in time, and the user is again detected as enjoying the second set, then the user may be detected as enjoying the sets close together in time and the distance between them may be shortened. If, however, a user is detected as not enjoying the second set because the user did not listen to a substantial portion of the set and skipped over the second set, then the distance between the first set and the second set may be lengthened.

As discussed above, a distance between two sets (and two songs) may be considered an indication of a likelihood that a user will want to listen to a second set close in time to a first set, if the user liked the first set. Two sets that the user will want to listen to together will have a high likelihood, and two sets that the user will not want to listen to together will have a low likelihood. Accordingly, the distance between a first set and a second set can be thought of as a probability that the second set will be selected next when a user is listening to a first set. If skipping habits show that a user is not skipping much, then a second set with a small distance (and high probability) will likely be selected, but if the skipping habits show that a user is skipping a great deal, then a second set with a larger distance (and a lower probability) will likely be selected. Accordingly, while the example is given above in terms of absolutes (e.g., sets with ever greater distances "are" selected), it should be appreciated that the selection of a set may, in embodiments, be probabilistic.

In some embodiments, the probabilities represented by the distances between sets may be fixed and are used as they are represented in the collection. In other embodiments of the invention, however, the probabilities may be adjusted based on other factors.

Recent and long-standing preferences (as indicated by a user explicitly, by input, or implicitly, such as by skipping habits over time) may influence set selection in some embodiments of the invention. For example, a number of times each song or set was played and skipped within a window of time (e.g., the past 12 months), and a time of each play/skip, may be tracked to determine a popularity of each song/set. This popularity can be used to identify long-standing preferences, such as favorite songs or favorite sets. Similar techniques can be used for recent preferences by using a smaller time window (e.g., the past week). Long-standing preferences can then be averaged with recent preferences to aid in determining the probability that a particular set should be played at a particular point in time.

For example, in determining a set to be selected, two categories of songs may be considered, namely, songs played (in their entirety) in the past 12 months and songs played (in their entirety) in the past week. Assigning different values to these sets may result in the songs being weighted differently. For example, songs played in the past week may be weighted more heavily than songs merely played sometime in the past 12 months. This may be done because a song the user has listened to recently may indicate user preferences at that time. On the other hand, songs played in the past 12 months may indicate long-standing user preferences, rather than passing interests, and thus may be more heavily weighted in some embodiments. In the example below, songs played in the past 12 months may be weighted at 50 percent and songs played in the most recent week may be weighted at 50 percent, such that recent behavior is weighted equally with long-standing behavior.

To use these, and other, weights, the weights are used to adjust base probabilities that songs and sets will be selected. If a user has four sets of songs that he/she has defined by creating four different playlists of songs, at any given time the user has an option of four different sets to which to listen. If the distances between the sets are equally weighted, when the consumer first requests content, there is a 25 percent chance that the user wants to listen to a particular playlist at that time (though the distances between sets may, in some cases, not be equal).

Skipping habits (including indications of recent "plays" and "skips") for individual songs over time can be used to refine those likelihoods and to redistribute the weighted probabilities to determine whether the user will want to listen to a certain set.

For example, when a particular user has a song that they like, and that song is only in one set out of the four, then the set with that song may be selected more often than the others to match the user's likes/dislikes. If the consumer has played a song seven times in the past twelve months and skipped the song three times, then, arithmetically, seven out of ten times that the song will be played, the consumer will want to consume the song—a 70 percent probability. Using the weighting factor above, 0.5 (50 percent, as a 50 percent weight was ascribed to behavior from the last 12 months) is subtracted, yielding 0.2. Multiplying by two renormalizes the scale, giving a 0.4 song weight. This song weight is then added to 1.0 to yield a weighting factor for a set that includes that song, giving a number greater than 1.0 (1.4) because the user likes the song.

Thus, a set with songs the user prefers may have a weight higher than other sets and may be more likely to be selected. Alternatively, for a song that the user skipped more often than played, the weighting factor will be less than others and may be less than 1.0.

The weighting factor for the set is multiplied by the original likelihood for each set (here, 25 percent, as calculated above). 25 percent multiplied by the weighting factor (1.4) yields 0.35 or 35 percent. Thus, based on the user's long-standing preferences, there is a 35 percent chance that the user will want to listen to the set having that song. Because total probability must sum to 100 percent, the probabilities for the other sets are decreased to a 21.7 percent probability that they want to listen to the other 3 playlists.

While the example given above is discussed in terms of modifying a weight based on a consuming/skipping behavior regarding one song, in embodiments these weights may be adjusted up or down based on consuming/skipping behavior regarding each of multiple songs in the set. Further, the weights may be modified on any other potential factors.

A probability of selecting a particular set after another set may, in some embodiments, be based on environmental factors. For example, time of day, location, and other environmental factors may influence a set selection in addition to recent skipping habits. When used, environmental factors may be considered in any suitable manner. For example, these factors may be used to create supersets of one or more sets of content, or "buckets." Each bucket may be defined by its matching factor(s), for example, "between 7 am and 9 am on weekdays," or "overnight location, or "daytime location." If a user is determined to be in a bucket (e.g., when the considerations corresponding to the bucket match current conditions, such as time, location, etc.), then sets within the bucket may be chosen before sets outside the bucket. This may be done in any way, such as by using higher thresholds. Further, individual sets within a bucket may be selected more frequently if they are determined to be popular. For example, if a set is consumed frequently within a bucket, then it may be assumed that the set is popular and the set may be selected more frequently when the user is detected to be in the bucket.

Figure 3:
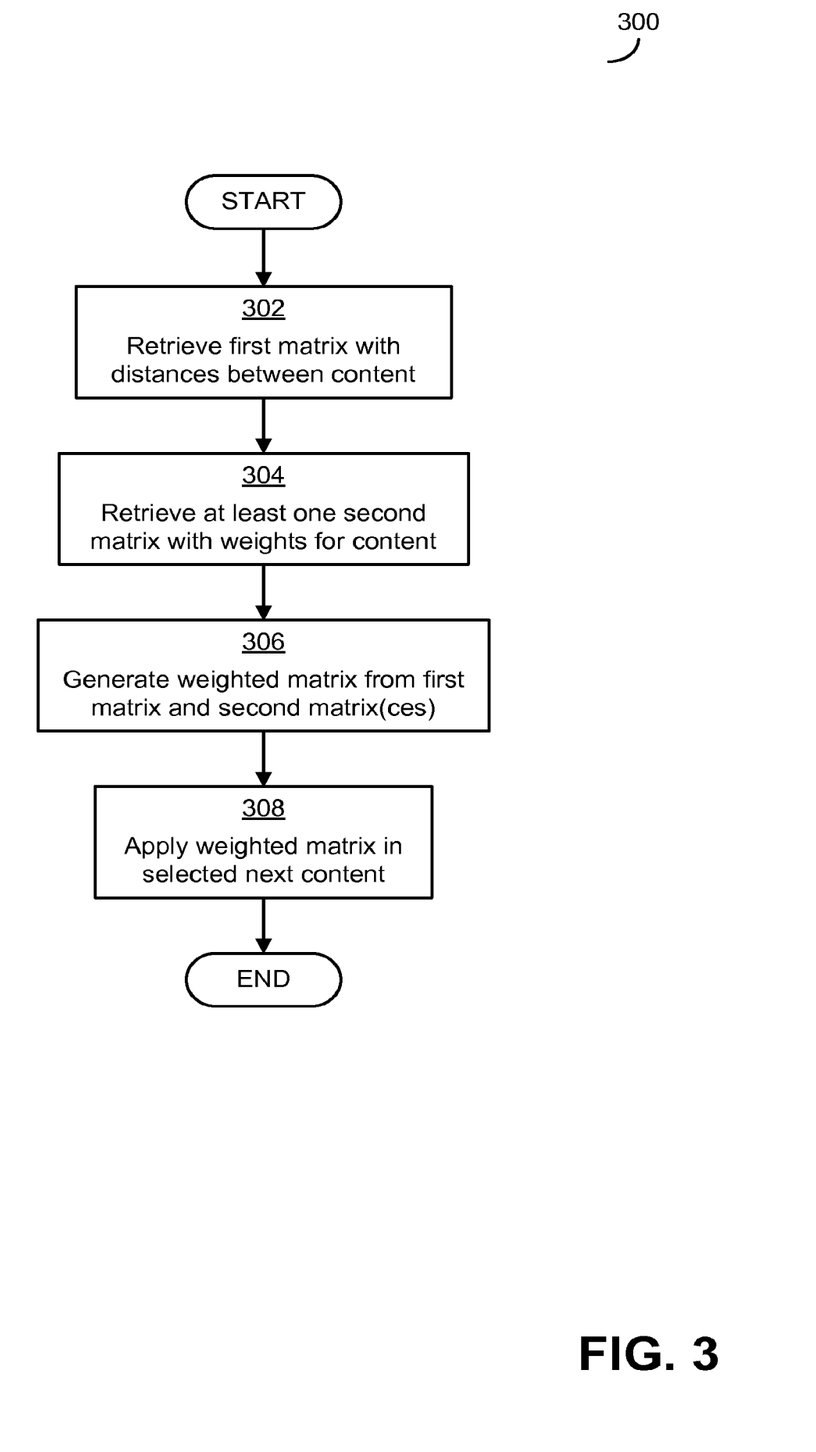
FIG. 3 is a flowchart of one exemplary process for selecting content to be presented to a consumer based on consumer interactions with the content and one or more weighting factors.

One exemplary process for selecting content for presentation to a consumer is illustrated in FIG. 3. Embodiments are not limited to implementing the exemplary process 300 of FIG. 3, as others are possible.

Process 300 begins in block 302, in which a first matrix is retrieved that includes distances between content. As discussed above, the distances in the first matrix identify a likelihood that a consumer will want to consume two pieces of content close together in time. The first matrix may be used in an unweighted determination of content to present next to a consumer.

In block 304, at least one second matrix is retrieved that identifies weights for content or pairs of content. A weight may indicate, for example, a popularity of a particular piece of content or a likelihood that the consumer will want to consume the content or will want to consume the content at that particular moment. Any suitable factors may be used in determining weights, as discussed above.

In block 306, the matrix retrieved in block 302 and the matrix or matrices retrieved in block 304 are used to generate a weighted matrix that identifies a weighted likelihood that a consumer will want to consume two pieces of content close together in time A particular value in the weighted matrix may, for example, indicate both a likelihood that a consumer will want to consume a piece of content and a likelihood that the consumer will want to consume the piece of content close in time to another piece of content. Generating the weighted matrix in block 306 may be done in any suitable manner, including by multiplying the matrix of block 302 by the matrices of block 304. The exact way in which the weighted matrix is generated in block 306 may vary based on what matrices are retrieved in block 304, a format of those matrices, and a type of the weights related to those matrices.

In block 308, regardless of how the weighted matrix is generated in block 306, the weighted matrix is used in a random selection process to determine a next content to be selected and presented to the consumer. Once the content is selected in block 308, the process 300 ends.

Techniques operating according to the principles described herein may be implemented in any suitable manner. Included in the discussion above are a series of flow charts showing the steps and acts of various processes that personalize selection of content for presentation based on consumer interactions with content. The processing and decision blocks of the flow charts above represent steps and acts that may be included in algorithms that carry out these various processes. Algorithms derived from these processes may be implemented as software integrated with and directing the operation of one or more multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one of ordinary skill in the art may use to fabricate circuits or to implement computer software algorithms to perform the processing of a particular apparatus carrying out the types of techniques described herein. It should also be appreciated that, unless otherwise indicated herein, the particular sequence of steps and acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, or any other suitable type of software. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations needed to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package, for example as a software program application such as Instinctiv Player available from Instinctiv, Inc. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 404 of FIG. 4 described below (i.e., as a portion of a computing device 400) or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system. Functional facilities that comprise these computer-executable instructions may be integrated with and direct the operation of a single multi-purpose programmable digital computer apparatus, a coordinated system of two or more multi-purpose computer apparatuses sharing processing power and jointly carrying out the techniques described herein, a single computer apparatus or coordinated system of computer apparatuses (co-located or geographically distributed) dedicated to executing the techniques described herein, one or more Field-Programmable Gate Arrays (FPGAs) for carrying out the techniques described herein, or any other suitable system.

Figure 4:
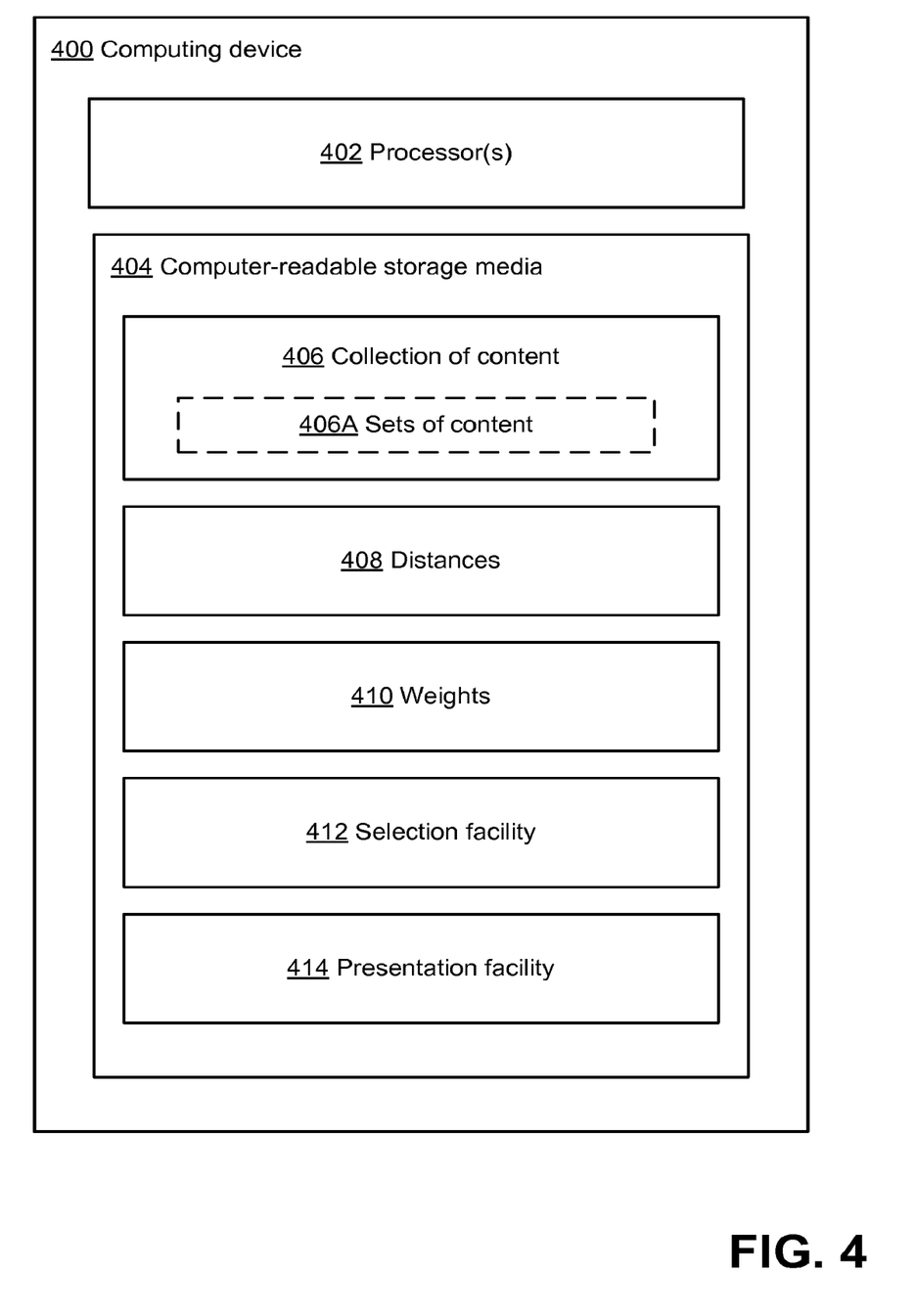
FIG. 4 is a block diagram of one exemplary computing device with which embodiments may operate.

FIG. 4 illustrates one exemplary implementation of a computing device in the form of a computing device 400 that may be used in a system implementing the techniques described herein, although others are possible. It should be appreciated that FIG. 4 is intended neither to be a depiction of necessary components for a computing device to operate in accordance with the principles described herein, nor a comprehensive depiction.

Computing device 400 may comprise at least one processor 402 and computer-readable storage media 404. Computing device 400 may be, for example, a desktop or laptop personal computer, a personal digital assistant (PDA), a personal media player, a smart mobile phone, a server, an audio/visual component, or any other suitable computing device. Computer-readable media 404 may be adapted to store data to be processed and/or instructions to be executed by processor 402. Processor 402 enables processing of data and execution of instructions. The data and instructions may be stored on the computer-readable storage media 404 and may, for example, enable communication between components of the computing device 400.

The data and instructions stored on computer-readable storage media 404 may comprise computer-executable instructions implementing techniques which operate according to the principles described herein. In the example of FIG. 4, computer-readable storage media 404 stores computer-executable instructions implementing various facilities and storing various information as described above. Computer-readable storage media 404 may store a collection of content 406, which may include any suitable content in one or more forms. The collection of content 406 may also include an indication 406A of sets of content, which may be information indicating set(s) to which content belongs. The computer-readable storage media 404 may also includes a data store 408 of information regarding distances between sets and/or between songs, which may be a set of values for distances organized in any suitable manner, and a data store 410 of weights regarding songs or sets of songs, which may be a set of values for weights organized in any suitable manner. Computer-readable storage media 404 may also include a selection facility 412 for detecting consumer skipping behavior and selecting content to be presented to the consumer and a presentation facility 414 for presenting content to the consumer.

While not illustrated in FIG. 4, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A machine adapted to select content to be presented to a consumer, the machine comprising:
    at least one storage medium comprising processor-executable instructions and storing a content library, the content library being stored as a collection of sets of content, each set of content comprising one or more pieces of content and being related to at least one other set, content of a first set and content of a second set are separated by one or more distances that indicate a likelihood that the consumer will want to consume a piece of content of the first set close in time to other content in the first set and content of the second set; and
    at least one processor that, upon executing the processor-executable instructions stored in the at least one storage medium, selects content to be presented to the consumer from the content library stored on the at least one storage medium by performing acts of:
    presenting a first piece of content from the first set to the consumer;
        if the consumer consumes the first piece in entirety, selecting a second piece of content from the first set to present to the consumer next;

if the consumer skips the first piece, selecting a piece of content from the second set, wherein the second set is related to the first set by the likelihood, and the second set is selected to have a likelihood inversely proportional to a number of recent skips of the consumer; and adjusting a distance between the first piece and other content in the first set based on whether the consumer consumes the first piece in entirety or skips the first piece.

2. A computer-implemented method for selecting content to be presented to a consumer, wherein content is selected from a content library stored on at least one storage medium, the content library being stored as a collection of sets of content, each set of content comprising one or more pieces of content and being related to at least one other set, content of a first set and content of a second set are separated by one or more distances that indicate a likelihood that the consumer will want to consume a piece of content of the first set close in time to other content of the first set and content of the second set, the method comprising acts of:

(A) presenting a first piece of content from the first set to the consumer;

(B) if the consumer consumes the first piece in entirety, selecting a second piece of content from the first set to present to the consumer next;

(C) if the consumer skips the first content, selecting a piece of content from the second set, wherein the second set is related to the first set by the likelihood, and the second set is selected to have a likelihood inversely proportional to a number of recent skips of the consumer; and (D) adjusting a distance between the first piece and other content in the first set based on whether the consumer consumes the first piece in entirety or skips the first piece.

3. At least one computer-readable storage medium having stored thereon a data structure, the data structure storing a content library as a collection of records, the data structure comprising:

at least one record defining a first set of content, each record comprising:
  at least one subrecord identifying a piece of content that is in the first set, and
  an identification of at least one other set stored in another record, content of the at least one other set being separated from the first set by a distance that indicates a likelihood that a consumer will want to consume content of the first set close in time to the content of the other set, the distance being based on a combination of long-standing and recent preferences of the consumer, the long-standing preferences being preferences made over a time period that is greater than a recent time period, wherein the data structure enables performance of a method of:

selecting content for presentation to the consumer from one or more sets defined by the at least one record in such a manner that, if it is determined that the consumer is not enjoying the first set, a second set of the at least one other set having a low likelihood that the consumer will want to consume the first set close in time to the second set can be selected.

4. The data structure of claim 3 wherein the long-standing preferences comprise a number of times one or more songs within the first set or the at least one other set were played and skipped within the past 12 months.

5. The data structure of claim 3 wherein the recent preferences comprise a number of times one or more songs within the first set or the at least one other set were played and skipped within the past week.

* * * * *